VIBRATORY FREQUENCY STANDARD FOR A TIMEKEEPING DEVICE

Original Filed July 10, 1964 6 Sheets-Sheet 1

INVENTORS
KLAUS SPARING
WILHELM TILSE
BY
Davis, Hoxie, Faithfull & Hapgood
ATTORNEYS May 23, 1967 K. SPARING ETAL 3,320,738

VIBRATORY FREQUENCY STANDARD FOR A TIMEKEEPING DEVICE

Original Filed July 10, 1964 6 Sheets-Sheet 2

INVENTORS
KLAUS SPARING
WILHELM TILSE

BY

Davis, Hoxie, Faithfull & Hapgood
ATTORNEYS

May 23, 1967 K. SPARING ETAL 3,320,738

VIBRATORY FREQUENCY STANDARD FOR A TIMEKEEPING DEVICE

Original Filed July 10, 1964 6 Sheets-Sheet 3

INVENTORS
KLAUS SPARING
WILHELM TILSE
BY
Davis, Hoxie, Faithfull & Hapgood
ATTORNEYS

VIBRATORY FREQUENCY STANDARD FOR A TIMEKEEPING DEVICE

Original Filed July 10, 1964 6 Sheets-Sheet 4

INVENTORS
KLAUS SPARING
WILHELM TILSE
BY
Davis, Hoxie, Faithfull & Hapgood
ATTORNEYS

INVENTORS
KLAUS SPARING
WILHELM TILSE

BY

Davis, Hoxie, Faithfull & Hapgood
ATTORNEYS

VIBRATORY FREQUENCY STANDARD FOR A TIMEKEEPING DEVICE

Original Filed July 10, 1964 6 Sheets-Sheet 6

INVENTORS
KLAUS SPARING
WILHELM TILSE
BY
Davis, Hoxie, Faithfull & Hapgood
ATTORNEYS United States Patent Office 3,320,738
Patented May 23, 1967

3,320,738

VIBRATORY FREQUENCY STANDARD FOR A TIMEKEEPING DEVICE

Klaus Sparing, Pforzheim, and Wilhelm Tilse, Pforzheim-Birkenfeld, Germany, assignors to the United States Time Corporation, Waterbury, Conn., a corporation of Connecticut Original application July 10, 1964, Ser. No. 382,440, now Patent No. 3,201,932, dated Aug. 24, 1965. Divided and this application June 24, 1965, Ser. No. 476,776
Claims priority, application Germany, Mar. 16, 1963, U 9,647
The portion of the term of the patent subsequent to Aug. 24, 1982, has been disclaimed
3 Claims. (Cl. 58—23)

This application is a division of application Ser. No. 382,440, filed July 10, 1964, now Patent No. 3,201,932, issued Aug. 24, 1965. The said application Ser. No. 382,440 was a continuation-in-part based upon application 325,027, filed Nov. 20, 1963, now abandoned.

The present invention relates to a timekeeping device having, as its time standard, a mechanical oscillator excitable to uniform oscillations.

In the known timekeeping devices of this type, the oscillator is coupled with the base, so that the oscillation frequency and accuracy is affected by the magnitude of this coupling. By the base is here meant not only the mounting support but the sum of all parts which are firmly connected with the mounting support and are not part of the oscillator. For example, a different damping of the base can affect the coupling and therefore affect the timekeeping accuracy.

In portable timekeeping devices, e.g. wrist watches, in which only energy sources of a relatively small capacity can be used, present devices have the considerable disadvantage that energy is carried to the coupled base. This means energy will be lost. Known devices of this type tried to overcome these disadvantages by having the base, in comparison to the oscillating system, relatively large and heavy. This made the timekeeping device relatively large and heavy, which is undesirable in portable watches. Even so, the loss of energy cannot basically be overcome by such preventive measures. Another disadvantage of this known timekeeping device is that the oscillator is shock sensitive. In response to outside shocks the oscillator changes its oscillation amplitude and frequency. One means to overcome the effect of shock is to use an oscillator, such as a tuning fork, having a high inherent oscillation frequency. In such a high-frequency device the coupling with the base is greater than with an oscillation arrangement of lower frequency, so that the diminution of the disadvantage of shock results in a greater loss of energy.

In accordance with the present invention, an oscillator is positioned on a base and is mechanically driven to uniform oscillation, the oscillation frequency serving as the timekeeping standard. The disadvantages of the prior art devices are avoided by means of an oscillation arrangement which has a multiple of oscillators which compensate for exterior effects. By this compensation practically no effective coupling exists between the base and oscillation system, so that the frequency stability cannot be affected by shock or other force components which act on the base, for instance different damping of the base. Exterior shocks and vibrations, which affect the base, do not affect the frequency stability of these systems, or at least affects them less.

The construction of the present invention can advantageously be made so that the oscillation arrangement has two oscillation systems which have at least one oscillator each, the oscillators being excitable to preferably frictionfree oscillations of equal frequency by receiving essentially equal oscillation impulses. Both oscillation systems are arranged so that their exterior reaction sources are essentially opposingly directed. An oscillation arrangement which is oscillation compensated against exterior influences is the result of this construction. As a rule, it is desirable, for production reasons, that at least two oscillators of the oscillation arrangement have equal masses, i.e. equal moments of inertia, and that their directional energy also be equal, i.e. equal direction moments.

In order to obtain an optimum of oscillation compensation according to the invention, it is provided that the product $Aw$ ($A$=moment of inertia of the concerned oscillator, $w$=amplitude) for oscillators of different oscillation systems is approximately equal in magnitude.

The present invention provides diaphragm oscillators in which each of the oscillating systems is a diaphragm oscillator, the oscillators being similar and arranged on the same axis at a predetermined distance from each other. Each diaphragm may be clamped on two opposite spots of its circumference so that the distance between the clamps is greater than the average width of the diaphragm.

The impulse to the oscillation arrangement can be given in any appropriate manner. For example, one oscillator may be excitable by an impulse device and the other oscillator excited by being coupled with it. In this case the inherent oscillation frequency of the coupled oscillator is in phase opposition to the exteriorly impulsed oscillator.

In one preferred embodiment of the invention, at least two oscillators are oscillation excitable by separate exterior impulse devices. In this embodiment, both oscillators are impulsed independently from each other with the amplitude, frequency and phase necessary for the oscillation compensation. It can also be provided that at least two oscillators are oscillation excitable by a common impulse device. A suitable device is an electromagnet with at least one exciter coil. The exciter coil cooperates with opposite coils or ferromagnetic bodies to deliver the impulse. Permanent magnets are preferred as the ferromagnetic bodies.

The impulse device can be self-controlling, as is known in the art, so that the exciter current induced in the exciter coil is synchronized with the inherent oscillation frequency of one of the oscillators. The impulse device can also be constructed in other ways, for example so that the impulse device receives its control or regulation commands from a separate source. Such a separate source may be an appropriate oscillation generator.

In order to improve the oscillation compensation, an amplitude adjustment device is provided for the adjustment of at least one of the oscillators. For example, a suitable amplitude adjustment device is a limiting means which restricts the amplitude to a preset maximum range or peak. Depending on the quality of the desired compensation, the width of this maximum range can be larger or smaller. It has been shown that, in general, it is sufficient when the maximum range is not greater than 10–15% of the average amplitude. The amplitude means may be a flexible banking device or a contact-free device such as coils or magnets.

A preferred amplitude adjustment device can be adjusted to control various amplitudes of the oscillator. In this arrangement the oscillation amplitude can be adjusted without changing the form of oscillation.

In order to synchronize the inherent frequencies of the two oscillators, at least one of the oscillators has an adjustment means for the adjustment of its inherent frequency. The same adjustment means can also be used for the adjustment of the time standard of the timekeeping device.

In the known timekeeping devices, the oscillation arrangement is relative light compared with the base, in order to keep the coupling between the oscillation arrangement and the base within tolerable limits. By using the present invention, the moment of inertia of the oscillators can be chosen independently from the mass (moment of inertia) of the base.

The present invention permits one to choose the optimum oscillator without consideration of the mass of the base. In portable watches, e.g. wrist watches, a heavier oscillation arrangement having good frequency stability can be used by employing the present invention than in the previous constructions of this type. The mass (moment of inertia) of the base can be chosen so that it corresponds to stability specifications or any other constructive conditions. In case of a present total weight or a preset outer dimension of the timekeeping device, the frequency stability can still be high because the moment of inertia of a single oscillator is at least equal in magnitude, and preferably greater, than the moment of inertia of the base.

The drawings show various forms of execution of the invention. In the drawings.

In order to simplify the drawings, the corresponding parts have the same reference numbers in all the figures.

Figure 1:
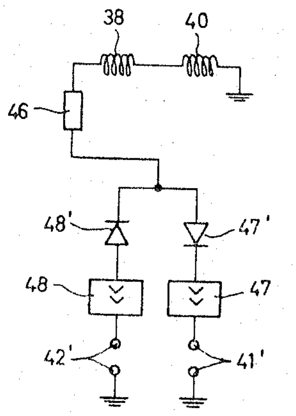
FIG. 1 is a circuit diagram of an amplitude adjustment device that can be used with the oscillating system.

The circuit is shown in FIG. 1. The coils 38 and 40 are induction coils in which voltages are induced by the permanent magnetic end pieces. The voltages correspond to the oscillations. In the circuit of FIG. 1, coils 38 and 40 are in opposite circuits so that the induced voltages are at any time in opposite directions. The exciter coils, which are connected to the terminals 41 and 42, are excitable in phase so that the oscillators oscillate and cause the voltages induced in the coils 38 and 40 to be opposed in phase. As long as the amplitude of the oscillators is equal, the voltages induced in the coils 38 and 40 will be equal and therefore no voltage drop will occur across the resistor 46. However, when the rotational oscillators have different amplitudes, a voltage drop occurs across resistor 46. The polarity of the voltage drop depends upon which of the oscillators oscillates with the greater amplitude. A voltage is impressed on one or the other of amplifiers 47 and 48 over their rectifiers 47' and 48', respectively. The voltage is amplified and impressed to the amplitude control winding connected to the amplifier. The excitement of this amplitude control winding causes an attentuation of the magnetic field created by the winding and therefore limits the amplitude of its oscillator to values approximately that of the other oscillator. The amplitude adjustment device shown in this form of construction is only an example of the type of device which may be used.

Figure 2:
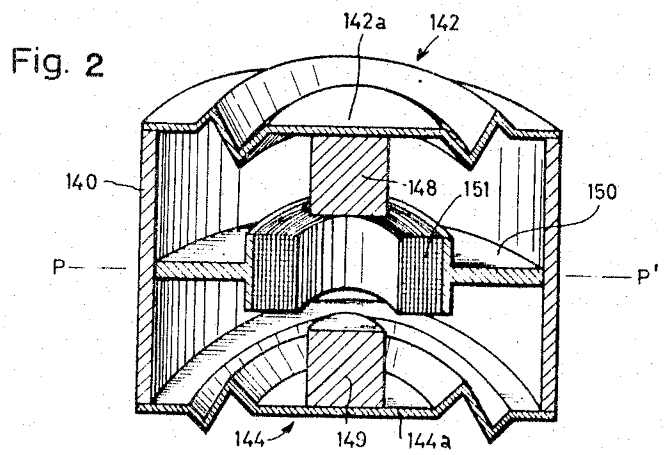
FIG. 2 is a perspective view of a section of a symmetrical diaphragm oscillation arrangement.

FIG. 2 shows a diaphragm oscillating system which is closed in itself. This oscillating system is symmetrically built in respect to a central symmetry plane called P–P'.

Flexible diaphragms 142 and 144 are positioned on both the upper and lower front openings of a symmetrical case 140. Symmetrical permanent magnets 148 and 149, which reach the interior of the case on extension of the diaphragm, are fixed on the central parts **142*a* and 144*a* of the diaphragms. An exciter coil 151 is fixed relatively rigidly to the interior of the case by ring carrier 150 so that equal forces are exerted by the coil on both permanent magnets 148 and 149. This exciter coil 151 is connected to an exciter circuit (not shown) which excites both diaphragm oscillation systems 142 and 144** in the rhythm of their equal inherent oscillation frequencies.

Figure 3:
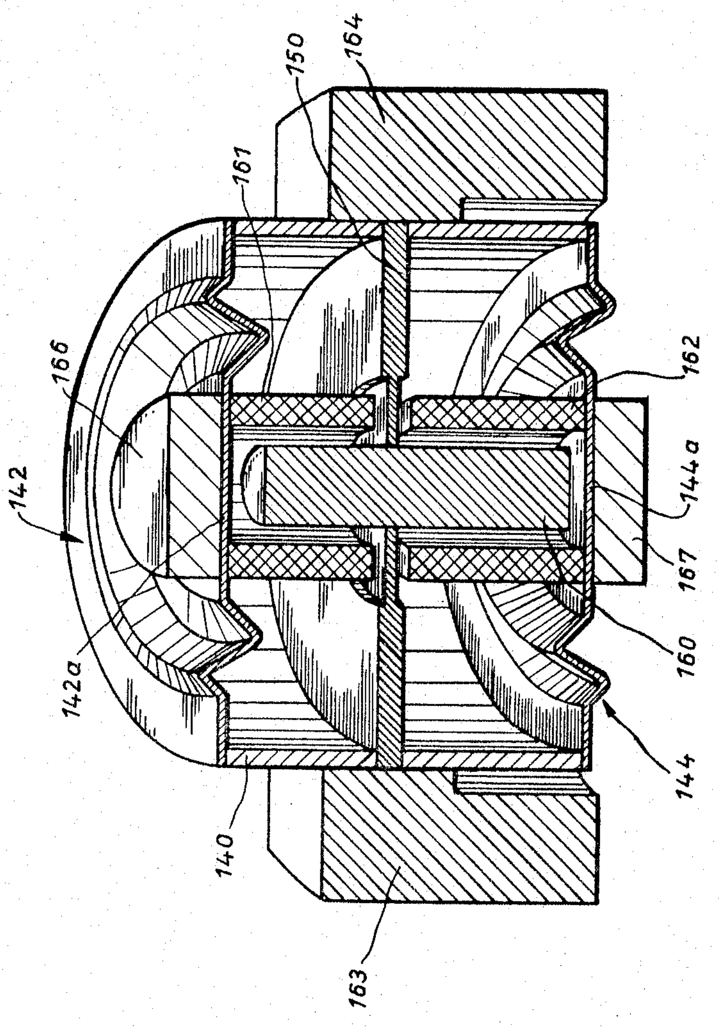
FIG. 3 is a perspective cut-away view of an oscillating arrangement using two diaphragm oscillators.

The construction shown in FIG. 3 is similar to that of FIG. 2. In this embodiment a cylindrical base 140 is attached to two upraised support members 163 and 164. A center plate 150 attached to cylindrical base 140 has at its center a permanent solid cylindrical rod magnet 160. This magnet cooperates with an exciter coil 161 attached to diaphragm 142 and with an exciter coil 162 attached to diaphragm 144. A small cylindrical compensation weight 166 is attached on the outer surface at the center of diaphragm 142 and a similar compensation weight 167 is attached to diaphragm 144. These compensation weights equal the weight of the coil on the other side of their diaphragms. The coils 161 and 162 are excited at the same time. This causes the coils to move away from the fixed permanent magnet 160 and the diaphragms 142 and 144 to move simultaneously outward. The pulse to the exciter coils is short, so that when the flexible diaphragms return to their starting position by their spring action there is no current flowing in the coils.

Figure 4:
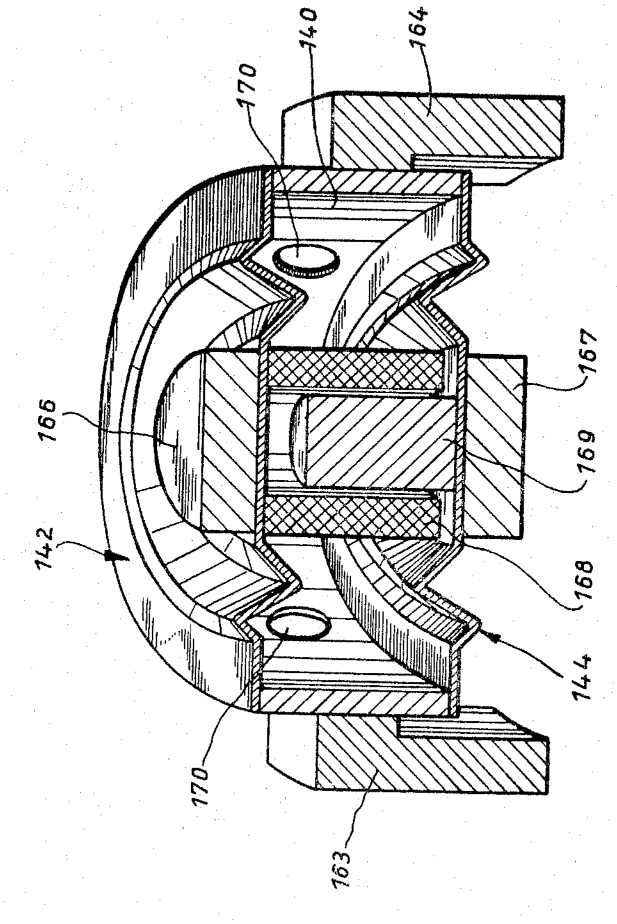
FIG. 4 is a perspective cut-away view of a variation of the embodiment of FIG. 3.

The construction of FIG. 4 is also similar to that of FIG. 2. In FIG. 4 the cylindrical base 140 is secured to upright support members 163 and 164. Holes 170 are provided in base 140 to permit entry and exit of air into the cylindrical member. The cylindrical member 140 with the attached diaphragms 142 and 144 forms a can-like structure. A coil 168 is attached to diaphragm 142 and a permanent cylindrical member **16*g*, which fits within the coil, is attached to diaphragm 144. A cylindrical compensation weight 166 is attached to the outside of diaphragm 142 and similarly a compensation weight 167 is attached to the outside of diaphragm 144**.

For this purpose the diaphragms are formed so that their elasticity in the oscillation direction (in the direction of the axis of the coil and permanent magnet) is greater, preferably at least ten times greater, than in the radial direction. This difference of elasticity in both directions results in the amplitudes of oscillations transverse to the direction of the axis of coil 168 and permanent magnet 169 being small compared with the amplitudes of the oscillations in the axial direction.

The compensation weights mentioned can be used for adjustment of the inherent oscillation frequency of the oscillator to which it is attached. For example, the adjustment can be made by reducing the weight of the compensation weight by drilling or by electro-erosion until the desired inherent oscillation frequency is obtained.

It is preferred that the damping of cooperating single oscillating systems be adjusted to an almost equal magnitude, which results in an optimum compensation and minimum repercussions on the frame plate.

Figure 5:
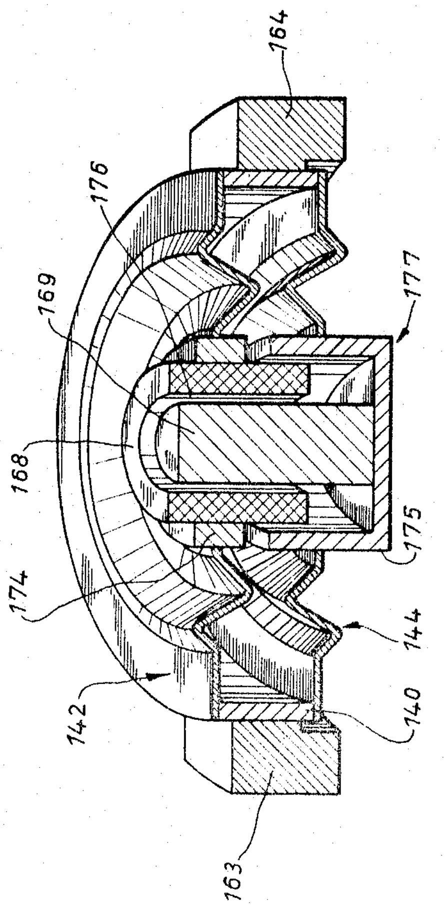
FIG. 5 is a perspective cut-away view of another variation of the embodiment of FIG. 3.

The construction of FIG. 5 is similar to that of FIG. 4, except for the mounting of the coil and magnet. In FIG. 5 the coil 168 is mounted at its circumference within an opening in diaphragm 142. The permanent magnet in this case comprises a cylinder portion and an end 175 to which is attached a cylinder rod magnet 169. The entire magnet structure 177 fits within an opening in diaphragm 144.

Figure 6:
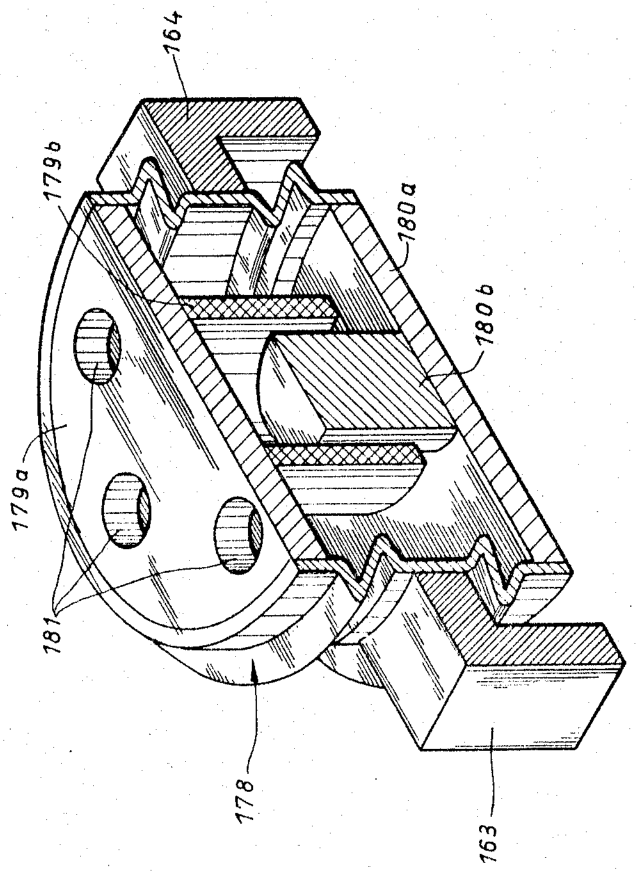
FIG. 6 is a perspective cut-away view of an oscillating arrangement in which the side walls oscillate.

In the construction of FIG. 6 the general configuration is again a can-like shape (syphon). The side of the can, i.e. the cylindrical portion 178, in this construction is flexible and is of spring material. Portion 178 is supported by standing members 163 and 164. The ends of the can **179*a* and 180*a* are rigid. End 179*a* has holes 181 for the entry and exit of air. An exciter coil 179*b* is attached to end 179*a* and a permanent magnet 180*b* is attached to end 180*a***.

We claim:

1. A timekeeping device including a base,
two mechanical oscillators attached to the base, means to impulse the oscillators to oscillate uniformly and at the same frequency, in which the oscillators compensate each other by having their products $Aw$ equal, where A is the moment of inertia of the oscillator, and $w$ is its amplitude of oscillation, and the reaction moments of the oscillators in-phase are in opposite directions, characterized in that both oscillators are diaphragms clamped at their periphery.

2. A timekeeper as in claim 1 wherein both diaphragms are mounted on a single cylindrical base and the diaphragms are circular.

3. A timekeeper as in claim 1 wherein the impulsing means comprises an exciter coil mounted on one diaphragm and a permanent magnet mounted on the other diaphragm.

References Cited by the Examiner

UNITED STATES PATENTS 3,170,278 2/1965 Stutz ---------------- 58—23

RICHARD B. WILKINSON, *Primary Examiner.*

G. F. BAKER, *Assistant Examiner.*